(12) United States Patent
Jeanton et al.

(10) Patent No.: US 10,183,654 B2
(45) Date of Patent: Jan. 22, 2019

(54) ASSEMBLY FOR SECURING A RETRACTABLE HEADLAMP WASHER DEVICE

(71) Applicant: Compagnie Plastic Omnium, Lyons (FR)

(72) Inventors: Raphael Jeanton, Saint Jean le Vieux (FR); Sebastien Rivoire, Caluire et Cuire (FR)

(73) Assignee: Compagnie Plastic Omnium, Lyons (FR)

( * ) Notice: Subject to any disclaimer, the term of this patent is extended or adjusted under 35 U.S.C. 154(b) by 465 days.

(21) Appl. No.: 14/438,313

(22) PCT Filed: Oct. 23, 2013

(86) PCT No.: PCT/FR2013/052543
§ 371 (c)(1),
(2) Date: Apr. 24, 2015

(87) PCT Pub. No.: WO2014/064388
PCT Pub. Date: May 1, 2014

(65) Prior Publication Data
US 2015/0298658 A1    Oct. 22, 2015

(30) Foreign Application Priority Data
Oct. 26, 2012 (FR) .................... 12 60261

(51) Int. Cl.
*B60S 1/60* (2006.01)
*B60S 1/52* (2006.01)
*B60S 1/46* (2006.01)

(52) U.S. Cl.
CPC . *B60S 1/60* (2013.01); *B60S 1/46* (2013.01); *B60S 1/528* (2013.01); *B60S 1/603* (2013.01)

(58) Field of Classification Search
CPC ......... B60S 1/528; B60S 1/3415; B60S 1/603
See application file for complete search history.

(56) References Cited

U.S. PATENT DOCUMENTS 5,242,114 A * 9/1993 Camier .................. B60S 1/528
239/284.2
6,793,153 B2 * 9/2004 Hirose .................... B60S 1/528
239/284.1

(Continued)

FOREIGN PATENT DOCUMENTS

| CN | 1733537 A | 2/2006 |
|---|---|---|
| CN | 101161515 A | 4/2008 |

(Continued)

*Primary Examiner* — Bradley Duckworth
(74) *Attorney, Agent, or Firm* — Jacox, Meckstroth & Jenkins

(57) ABSTRACT

An assembly for securing to a body part of a motor vehicle, a headlamp washer that is retractable through an opening made in this body part, the assembly having a support intended to receive the headlamp washer and a base, wherein one or the other of the base or the support comprises integrally produced connecting elements, these connecting elements being dimensioned such that they, alone, allow the body part to be sandwiched between the base and the support and allow this sandwiching to be maintained durably.

22 Claims, 2 Drawing Sheets

(56) References Cited

U.S. PATENT DOCUMENTS

| | | | |
|---|---|---|---|
| 7,168,752 B2* | 1/2007 | Bourennane | B60S 1/528 |
| | | | 15/250.02 |
| 7,699,244 B2* | 4/2010 | Sakai | B60S 1/528 |
| | | | 15/250.002 |
| 7,891,581 B2* | 2/2011 | Keller | B60S 1/528 |
| | | | 239/281 |
| 7,891,582 B2 | 2/2011 | Baba | |
| 8,113,444 B2* | 2/2012 | Litvinov | B05B 1/3436 |
| | | | 239/284.1 |
| 8,596,554 B2* | 12/2013 | Litvinov | B05B 1/3436 |
| | | | 15/250.002 |
| 2006/0027678 A1 | 2/2006 | Kimura | |
| 2008/0087744 A1 | 4/2008 | Baba | |
| 2017/0028969 A1* | 2/2017 | Kang | B29C 65/08 |

FOREIGN PATENT DOCUMENTS

| | | |
|---|---|---|
| DE | 3914768 C1 | 6/1990 |
| DE | 4121316 A1 | 1/1992 |
| EP | 1125808 A2 | 8/2001 |
| FR | 2681033 A1 | 3/1993 |
| JP | 2001301583 A | 10/2001 |

* cited by examiner

ASSEMBLY FOR SECURING A RETRACTABLE HEADLAMP WASHER DEVICE

CROSS-REFERENCE TO RELATED APPLICATIONS

This application is the U.S. National Phase application of PCT Application No. PCT/FR2013/052543 filed Oct. 23, 2013, which claims priority to the French application 1260261 filed on Oct. 26, 2012, which applications are incorporated herein by reference and made a part hereof.

BACKGROUND OF THE INVENTION

1. Field of the Invention

This invention relates to an assembly for securing a retractable headlamp washer on a vehicle body part.

The headlamp washer is a device mounted near the vehicle headlamps to spray the glass with water or a cleaning mixture.

It is part of a subassembly called the "headlamp washer kit" comprising the headlamp washer and a cylinder coupled to a return spring for moving the headlamp washer. A mounting bracket is provided to hold the headlamp washer kit on the vehicle body while a cover, attached or not to the retractable cylinder, hides the headlamp washer when it is in a retracted position inside the vehicle body. For the purposes of clarity, we will refer to the headlamp washer assembly as the "headlamp washer kit" considering the headlamp washer, the spring and the cylinder as a single unit.

2. Description of the Related Art

Document EP 1125808 A2 describes an assembly for securing a headlamp washer comprising a headlamp washer bracket using in particular screws. Screws are the added securing means most commonly used, but other added securing means are also encountered, for example metal clips. In general, the added securing means press the headlamp washer bracket forcefully against the body and eliminate the clearance while ensuring the attachment. Permanent securing means are also used, such as welds or glue spots.

Thus, the existing solutions propose assemblies for securing headlamp washers involving the use of added or permanent fasteners to perform several functions, mainly to withstand vibrations while driving but also undergo repeated cylinder displacement cycles.

Moreover, these added or permanent fasteners are also intended to take up the clearance between the body and the mounting bracket, holding the headlamp washer in cantilever position reliably and durably, so that after the vehicle has been in use for several years the weight and vibrations of the headlamp washer do not lead to the appearance of clearance between the body and the mounting bracket.

During assembly on the vehicle, such mounting bracket solutions require a supply of added fasteners, an additional step of installing these added fastening means and involve the use of additional production equipment such as a power screwdriver, a welding set or a bonding device, for example. Moreover, when the securing means are screws or clips, the recyclability of the complete bumper is reduced due to the difficulty in separating these securing means, which are small metal components.

SUMMARY OF THE INVENTION

One objective of the invention is to propose a solution in which the headlamp washer carrier is held against the body, without having the aforementioned disadvantages.

The invention therefore relates to an assembly for securing, to a body part of a motor vehicle, a headlamp washer that is retractable through an opening made in this body part, the assembly having a support intended to receive the headlamp washer and a base, characterised in that the assembly composed of one or the other of the base or the support comprises integrally produced connecting elements, these connecting elements being dimensioned such that they, alone, allow the body part to be sandwiched between the base and the support and allow this sandwiching to be maintained durably Thus, this type of securing assembly holds a headlamp washer bracket durably, pressing it strongly against the vehicle body even though the headlamp washer is essentially in cantilever with respect to the body.

In addition, this type of securing assembly removes the need to supply added fasteners and eliminates the steps of installing these added fasteners as well as possible welding or gluing steps. This reduces the investments related to the associated production equipment and the space occupied by this equipment next to the production line.

Durable is taken to mean that, under normal situations of life of the system and for a period of approximately 10 years or after 100 000 km of use, there is no degradation in visual appearance, especially regarding the clearances and alignment of the hatch with respect to the skin and the clearances between the components of the headlamp washer nor any functional degradation such as jamming of the cylinder or appearance of vibrations.

The securing assembly as defined above may further comprise one or more of the following characteristics, taken alone or in combination.

Bearing surfaces between the support and the body part are formed by one side of the body part and the only bearing surfaces holding in position the support are the bearing surfaces between the support and the body part.

The support comprises upper and lower proximal bearing surface areas, the upper and lower proximal bearing surface areas resting against the edge of the opening of the body part.

The securing assembly includes a lower distal bearing surface area which rests against the body part at a distance allowing the upper proximal bearing surface area to be pressed durably against the body part.

The upper proximal bearing surface area has an edge adapted to rest on the body part, the edge having a width of less than or equal to 12 mm.

The distance between the lower proximal bearing surface area and the lower distal bearing surface area is less than or equal to 40 mm and preferably between 10 mm and 30 mm.

The connecting elements are latching lugs.

The horizontal and vertical positioning of the base relative to the support is ensured by projections integrally produced with the base or with the support.

The support is essentially in cantilever with respect to the bearing surface of the body against which the upper proximal bearing surface area is pressed.

The securing assembly comprises a leg adapted to maintain the support at least partly. Thus, the forces and vibrations to which the headlamp washer is subjected are transmitted to the vehicle body firstly by the connecting elements and secondly by the leg.

These and other objects and advantages of the invention will be apparent from the following description, the accompanying drawings and the appended claims.

BRIEF DESCRIPTION OF THE ACCOMPANYING DRAWINGS

It will be easier to understand the invention on reading the description below, given as an example and referring to the drawings, on which:

DETAILED DESCRIPTION OF THE PREFERRED EMBODIMENTS

Figure 1:
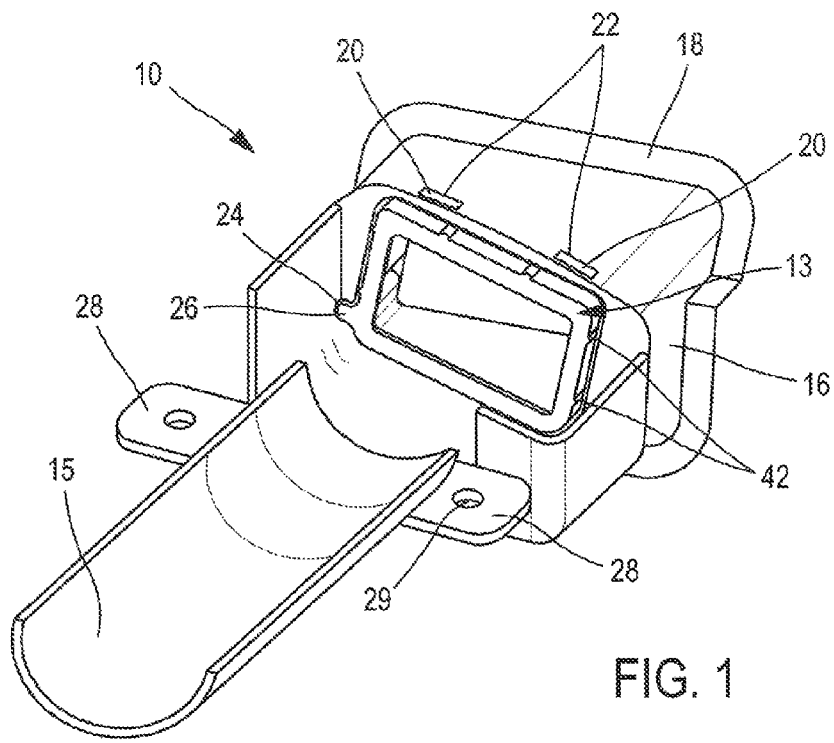
FIG. 1 is a perspective view of a securing assembly of a retractable headlamp washer device comprising a base and an embodiment.

FIG. 1 shows a securing assembly 10 of a retractable headlamp washer device which comprises a support 12 for receiving the headlamp washer (not shown) and a base 13 to cooperate with the support 12 for holding the headlamp washer in cantilever position on a vehicle body or body part 14.

The securing assembly 10 has a substantially semi-tubular section 15 adapted to receive the headlamp washer cylinder whose body is generally cylindrical. When the securing assembly 10 is mounted on the body part 14 of the vehicle, the support 12 is housed inside the body part 14 of the vehicle and supports the headlamp washer. The semi-tubular section 15 is extended by a portion 16 of substantially parallelepipedic volume forming the housing, in the retracted position, of the end of the cylinder comprising the nozzle or nozzles and which is located close to the body 11 when the headlamp washer support 12 is mounted on the vehicle. We see that this parallelepipedic portion comprises apertures 20 adapted to receive the connecting elements 22 of the base 13. In the present case, these connecting elements 22 are latching lugs integrally produced with the base 13. The latter also comprises a flat edge 18 on the periphery and of which a part is adapted to be pressed against a bearing surface area outside the body 11. The support 12 is therefore entirely in cantilever with respect to the inner bearing surface of the body 11 and the flat edge 18 of the parallelepipedic portion 16 is pressed against an inner edge of an opening of the body part 14.

In fact, bearing surfaces between the support 12 and the body part 14 are formed by one side of the body part 14 and the only bearing surfaces holding the support 12 in position are the bearing surfaces between the support 12 and the body part 14. We also see that the support 12 has a groove 24 adapted to receive a foolproofing projection 26 of the base 13.

In addition, between the semi-tubular section 15 and the parallelepipedic portion 16 there are two substantially horizontal and flat attachment portions 28 having holes 29 adapted to receive mounting screws holding the headlamp washer on the support 12 of the securing assembly 10.

Figure 2:
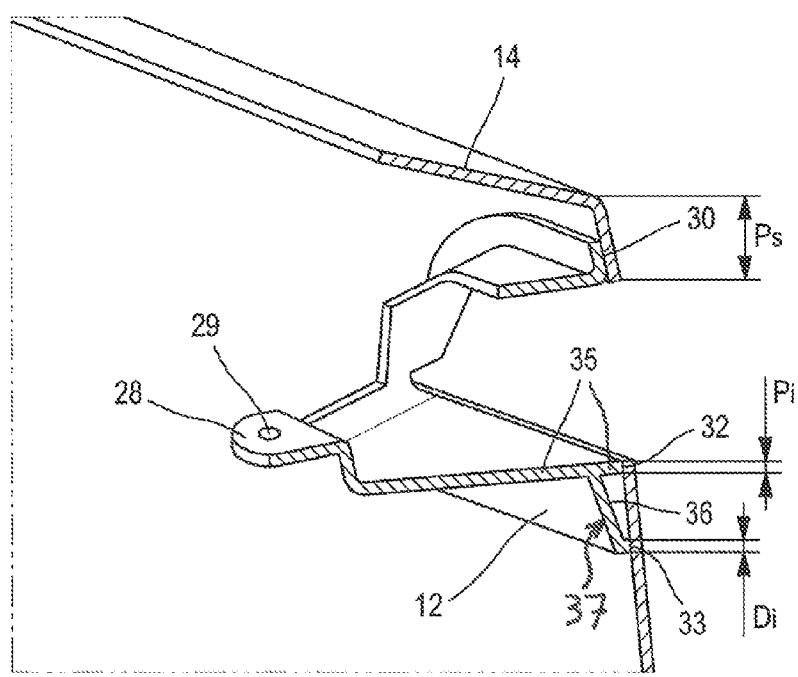
FIG. 2 is a perspective view in cross-section of the assembly for securing a retractable headlamp washer device of FIG. 1 without the base.

FIGS. 1 and 2 show that the flat edge 18 of the support 12 includes an upper proximal bearing surface area 30, a lower proximal bearing surface area 32 and a lower distal bearing surface area 33 which rest against the inner wall of the opening of the body part 14. It would also be possible to consider having a bearing surface area which does not include a flat edge 18, the upper proximal bearing surface area 30 in this case being formed by the wall thickness of the bracket or support 12.

FIG. 2 shows that the upper proximal bearing surface area 30 rests on an upper part of the edge of the opening, that the lower proximal bearing surface area 32 rests on a lower portion of the edge of the opening and that the lower distal bearing surface area 33 rests against the body part 14 at a distance allowing the upper proximal support area 30 to be pressed durably against the body part 14. To obtain this support, the lower proximal bearing surface area 32 is connected to the lower distal bearing surface area 33 by a substantially horizontal rib 35 and an inclined rib 36.

In fact, the lower distal area 33 is located in a position lower than the lower proximal area 32 to form, with the ribs 35, 36, a leg 37 which acts against the cantilever effect by taking up the forces and improving stability. These two ribs 35, 36, due to a design with tight tolerances and clearances between the support areas on the body part 14, produce a lever arm effect between the lower distal bearing surface area 33 and lower proximal bearing surface area 32. Thus, the leg 37 formed by the ribs 35, 36 is adapted to maintain the support at least partially. In fact the leg 37 transmits to the body part 14 some of the forces generated by the support cantilever and also transmits to the body part 14 some of the vibrations of the support when driving the vehicle.

In the example, the upper proximal bearing surface area 30 has a width Ps of 8 mm, the lower proximal bearing surface area has a width Pi of 1.5 mm and the lower distal bearing surface area 33 has a width Di of 1.5 mm. The distance between the lower proximal bearing surface area width Pi and the lower distal bearing surface area width Di is 15 mm. In the example, the contact area of the upper proximal bearing surface area 30 is at least five times the contact area of the lower proximal bearing surface area 32 and at least five times the contact area of the lower distal bearing surface area 33.

Figure 3:
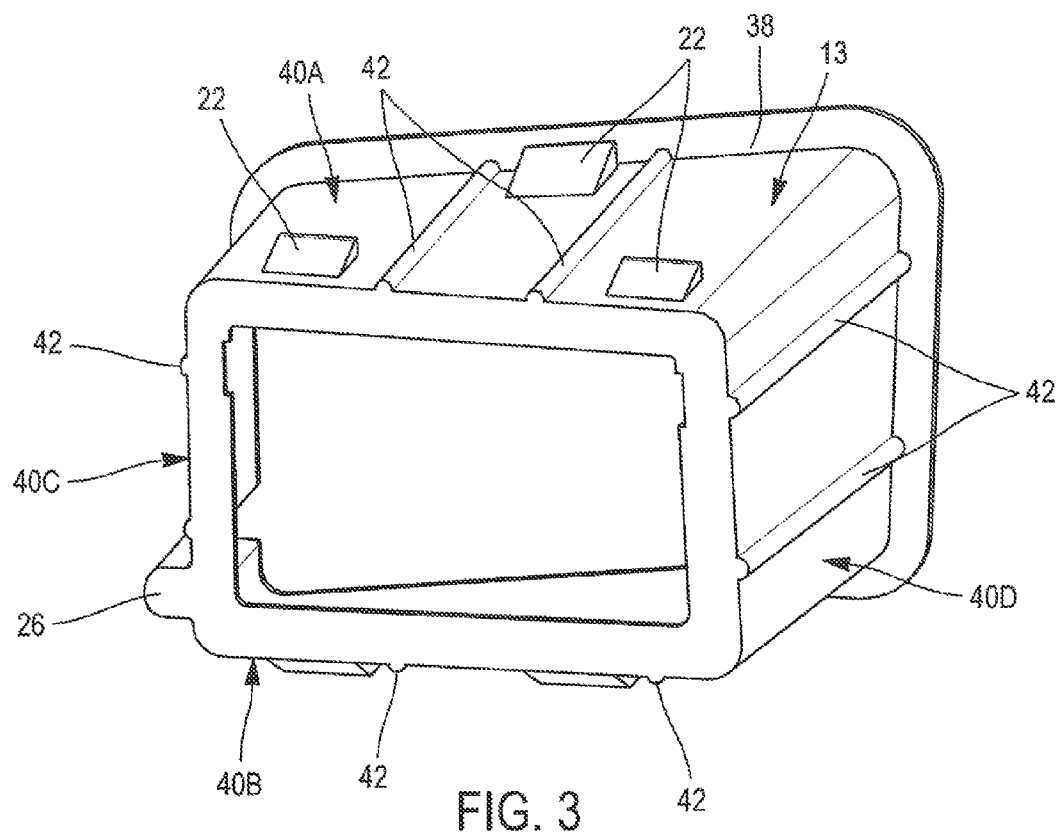
FIG. 3 is a perspective view of the base of FIG. 1 without the support.

FIG. 3 shows that the base 13 has a parallelepipedic shape adapted to fit in the opening of the vehicle body or body part 14 and inside the support 12 with which it cooperates to form the securing assembly. The base 13 comprises a flat peripheral edge 38 allowing it to be pressed against the skin of the body part 14. Connecting means 22 are integrally produced with the base 13 and arranged on an upper side 40A and on a lower side 40B of the base 13. These connecting means 22 are able to cooperate with support 12 which are apertures 20 in this example. Thus, the base 13 has four outer sides: an upper side 40A, a lower side 40B and two lateral sides 40C, 40D, each side having thin centring projections 42 designed to facilitate the horizontal and vertical positioning as well as the centring of the base 13 inside the support 12 and the body part 14.

The lateral side 40C has a foolproofing projection 26 to ensure the base 13 is positioned correctly with respect to the body part 14 and to the support 12 during assembly. This projection 26 cooperates with the groove 24 of the support 12 and with a recess 44 in the body part 14.

Figure 4:
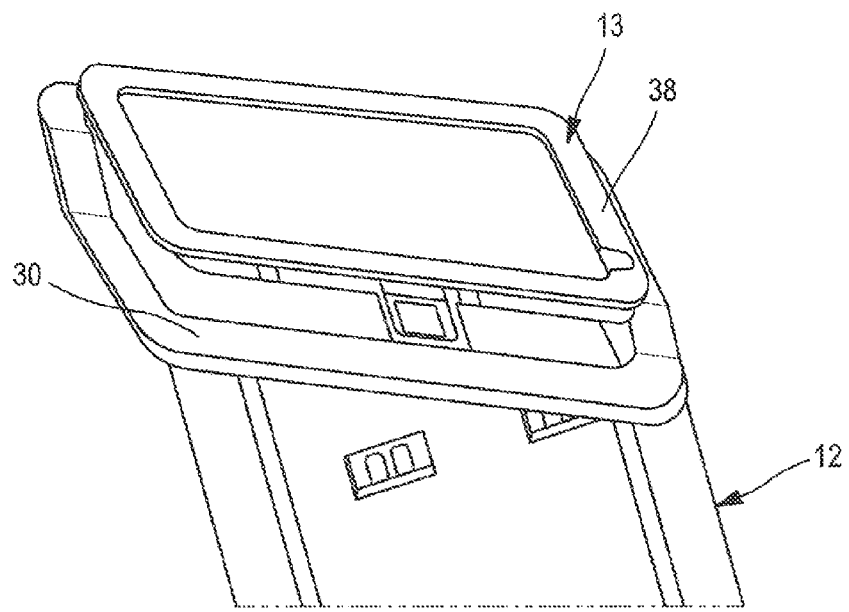
FIG. 4 is a perspective view in elevation of the securing assembly of FIG. 1.

FIG. 4 shows the support 12 and the base 13 which are mounted on the vehicle body or body part 14. The connecting elements 22 of the base 13 cooperate with the holes in the support 12, and the flat edge 38 of the base 13 rests on the body part 14. Thus, the base 13 and the support 12 are attached to the body part 14, the body part 14 being sandwiched between the flat edge 38 of the base 13 and the support 12. The connecting elements 22 and the holes are therefore the only means of attaching the base and the support on the vehicle body or body part 14. They are shaped to maintain the sandwiching durably but also to provide durable predetermined positioning of the support 12 and the base 13 relative to the vehicle body or body part 14.

Obviously, numerous modifications can be made without leaving the scope of the invention. In particular, the distance between the lower proximal bearing surface area width Pi (FIG. 2) and the lower distal bearing surface area width Di could be between 0 mm and 40 mm, and preferably between 30 mm and 40 mm. The bearing surface edges on the periphery of the support 12 or the base 13 may be continuous or discontinuous. One of the areas 30, 32 could also comprise a portion which would rest on the outer wall of the body part 14. The connecting elements 22 could be integrally produced with the support 12 and the corresponding holes located on the base 13. The rib 36 could be strengthened by a substantially vertical network of ribs, connecting it to the parallelepipedic portion 16 and/or to the rib 35. Lastly, the number or position of centring projections 42 could be different. For example, one side of the base 13 could have three projections 42 and the opposite side none at all.

While the process and method herein described constitute preferred embodiments of this invention, it is to be understood that the invention is not limited to this precise process and method, and that changes may be made therein without departing from the scope of the invention which is defined in the appended claims.

What is claimed is:

1. A securing assembly for securing to a body part of a motor vehicle a headlamp washer that is retractable through an opening made in said body part, said assembly having a support intended to receive said headlamp washer and a base, said support and said base being two separate parts, wherein either one of said base or said support comprises integral connecting elements, the other of said base or said support comprises cooperating means to engage with said integral connecting elements, said integral connecting elements and said cooperating means being dimensioned such that they allow at least a portion of said body part of said motor vehicle to be sandwiched between said base and said support so that said cooperating means and said integral connecting elements cooperate to secure said support and said base to said body part so that said body part becomes sandwiched and retained therebetween without using any other fasteners or connectors between said securing assembly and said body part.

2. The securing assembly according to claim 1, wherein each of said support and said body part comprise at least one bearing surface, said at least one bearing surface of said support engaging said at least one bearing surface of said body part such that the only bearing surfaces between said support and said body part, holding said support in position are said at least one bearing surfaces of said support and said body part.

3. The securing assembly according to claim 2, said support comprising upper and lower proximal bearing surface areas, said upper and said lower proximal bearing surface areas resting against an edge of said opening of said body part.

4. The securing assembly according to claim 2, comprising a lower distal bearing surface area which rests against said body part at a distance from an upper proximal bearing surface area, said distance allowing said upper proximal bearing surface area to be pressed against said body part.

5. The securing assembly according to claim 3, wherein said upper proximal bearing surface area has an edge adapted to rest on said body part, said edge having a width of less than or equal to 12 mm.

6. The securing assembly according to claim 3, comprising a lower distal bearing surface area which rests against said body part at a distance from said upper proximal bearing surface area, said distance allowing said upper proximal bearing surface area to be pressed against said body part.

7. The securing assembly according to claim 3, wherein the distance between said lower proximal bearing surface area and a lower distal bearing surface area is less than or equal to 40 mm.

8. The securing assembly according to claim 3, wherein the distance between said lower proximal bearing surface area and a lower distal bearing surface area is between 10 mm and 30 mm.

9. The securing assembly according to claim 2, wherein said integral connecting elements are latching lugs.

10. The securing assembly according to claim 2, wherein the horizontal and vertical positioning of said base relative to said support is ensured by projections integrally produced with said base or with said support.

11. A body part provided with an assembly according to claim 2, wherein said support is in cantilever with respect to a bearing surface of said body part against which an upper proximal bearing surface area is pressed.

12. The securing assembly according to claim 1, said support comprising upper and lower proximal bearing surface areas, said upper and said lower proximal bearing surface areas resting against an edge of said opening of said body part.

13. The securing assembly according to claim 12, comprising a lower distal bearing surface area which rests against said body part at a distance from said upper proximal bearing surface area, said distance allowing said upper proximal bearing surface area to be pressed against said body part.

14. The securing assembly according to claim 13, wherein the distance between said lower proximal bearing surface area and said lower distal bearing surface area is less than or equal to 40 mm.

15. The securing assembly according to claim 13, wherein the distance between said lower proximal bearing surface area and said lower distal bearing surface area is less than or equal to 40 mm.

16. The securing assembly according to claim 13, wherein said upper proximal bearing surface area has an edge adapted to rest on said body part, said edge having a width of less than or equal to 12 mm.

17. The securing assembly according to claim 13, wherein the distance between said lower proximal bearing surface area and said lower distal bearing surface area is between 10 mm and 30 mm.

18. The securing assembly according to claim 12, wherein said upper proximal bearing surface area has an edge adapted to rest on said body part, said edge having a width of less than or equal to 12 mm.

19. The securing assembly according to claim 1, wherein said integral connecting elements are latching lugs.

20. The securing assembly according to claim 1, wherein the horizontal and vertical positioning of said base relative to said support is ensured by projections integrally produced with said base or with said support.

21. A body part provided with an assembly according to claim 1, wherein said support is in cantilever with respect to a bearing surface of said body part against which an upper proximal bearing surface area is pressed.

22. The securing assembly according to claim 1, comprising a leg, said leg being formed by at least one rib, said at least one rib being adapted to maintain said against said body part in part by providing a cantilever or lever effect between a lower of a distal bearing surface area and a lower proximal bearing surface area.

\* \* \* \* \*

UNITED STATES PATENT AND TRADEMARK OFFICE
CERTIFICATE OF CORRECTION

Page 1 of 1

PATENT NO. : 10,183,654 B2
APPLICATION NO. : 14/438313
DATED : January 22, 2019
INVENTOR(S) : Jeanton et al.

It is certified that error appears in the above-identified patent and that said Letters Patent is hereby corrected as shown below:

On the Title Page

(71) Applicants, delete "Lyons" and insert --Lyon-- therefor.
(73) Assignees, delete "Lyons" and insert --Lyon-- therefor.

In the Claims

Column 7, Line 3, insert --support-- after "maintain said".

Signed and Sealed this
Fifth Day of March, 2019

Andrei Iancu
*Director of the United States Patent and Trademark Office*